Figure 1:
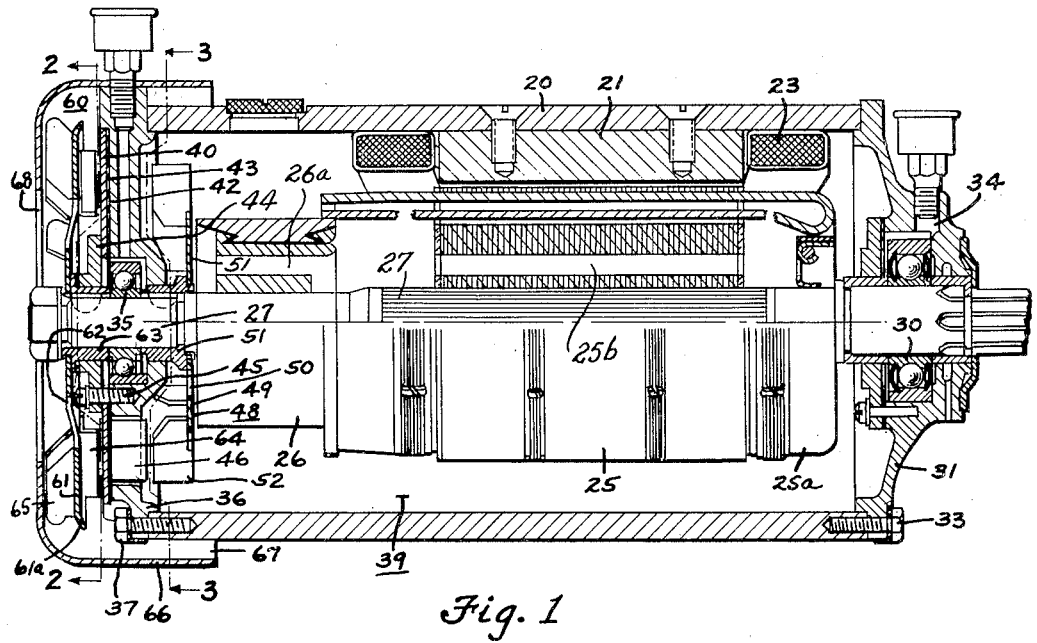

Jan. 10, 1950        E. M. CLAYTOR        2,494,471
VENTILATING APPARATUS FOR DYNAMOELECTRIC MACHINES
Filed April 12, 1946

INVENTOR
*Edward M. Claytor*
BY
*Spencer, Hardman & Fehr*
His ATTORNEYS

Patented Jan. 10, 1950

2,494,471

UNITED STATES PATENT OFFICE 2,494,471

VENTILATING APPARATUS FOR DYNAMO-ELECTRIC MACHINES

Edward M. Claytor, Anderson, Ind., assignor to General Motors Corporation, Detroit, Mich., a corporation of Delaware Application April 12, 1946, Serial No. 661,567

7 Claims. (Cl. 171—252)

This invention relates to improvements in dynamo-electric machines of the enclosed type.

According to the present invention the dynamo-electric machine stator frame is closed at each end to form a closed housing or chamber, one end of which is provided with a thin wall of good heat conductivity having radial fins or ribs on its inner face within the chamber. To increase the heat dissipating surface of the thin wall, a fan disposed on each side of the thin wall, the inner fan circulating and directing the air within the chamber into intimate contact with the fins and the thin wall and the outer fan having fins movable therewith and in close proximity to the outer face of the thin wall which swipes the heat from the plate to facilitate rapid transfer of heat from within the chamber and also to circulate sufficient cool air to cool the exterior of the stator frame along which air is directed by a shroud.

An object of the present invention is to provide an enclosed type dynamo-electric machine in which one end thereof will readily dissipate the heat within the interior of the machine to exterior air.

Further objects and advantages of the present invention will be apparent from the following description, reference being had to the accompanying drawings wherein a preferred embodiment of the present invention is clearly shown.

In the drawings:

Fig. 1 is a longitudinal sectional view through a dynamo-electric machine showing an embodiment of the present invention.

Figure 2:
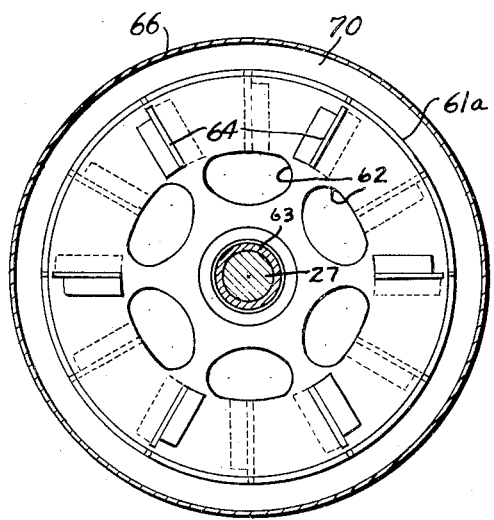
Figure 3:
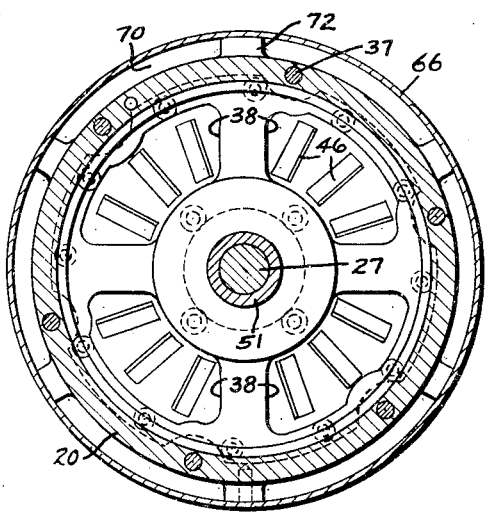

Figs. 2 and 3 are sectional views taken on lines 2—2 and 3—3, respectively of Fig. 1.

Referring to the drawings 20 designates a tubular stator frame on which are mounted a plurality of pole pieces 21, only one of which is shown, carrying field windings 23. The armature core 25 comprising a plurality of laminations is press-fitted or otherwise attached to a shaft 27. The core has aligned slots at its periphery which receive windings 25a. The core structure 25 is also provided with longitudinal ventilating passages 26b located near the shaft. A commutator 26 provided with ventilating passages 26a is also press-fitted or otherwise attached to the shaft 27. The shaft 27 is journalled at one end in a bearing 30 carried by an end member 31. The end member is secured to the stator frame 20 by screws 33 so as to make an air-tight joint therewith. The end member 31 is also provided with an oil duct 34 for the bearing 30.

At the commutator end, the shaft 27 is journalled in a bearing 35 carried by an end member 36 which is secured to the stator frame 20 by screws 37 to form an air-tight joint therewith. A number of openings 38 are arranged in the end member but circulated air within a chamber 39, formed by the end members 31, 36 and frame 20, is blocked from passing through these openings to the exterior of the chamber by a plate or disc 40 of good heat conductivity. The plate 40 fits into a suitable recess 42 provided by the end member 36. Between the bottom of the recess 42 and the plate 40 is a gasket 43 having openings corresponding to the number and contour of the openings 38 in end member 36. The plate 40 and the gasket 43 are secured in position to the end member 36 by a retainer plate 44 attached to the end member 36 by screws 45. A plurality of ribs or fins 46 of good heat conducting material are attached to the inner face of the disc 40 by spot welding or by other suitable means and extend through the openings provided by the gasket 43 and end member 36. In the present instance the fins 46 are arranged in groups of three with each group extending through one of the openings 38 as clearly shown in Fig. 3. It is pointed out that the end member 36 could be made of a material having high heat conductivity and that the fins 46 could be formed integral with the end member.

For producing a circulation of air within the closed chamber 39 formed by the stator 20, and end members 31 and 36, fan 48 attached to the shaft 27 is provided. It is well known that air agitation within a closed chamber will create heat, therefore it is important that a low volume type fan be used. This fan comprises a plate 49 having spaced openings 50 attached to a sleeve 51 keyed to the shaft 27. The plate 49 supports a plurality of blades 52 which are so arranged that the blades will produce a low volume air stream. This stream of air is drawn through the openings 25b in the armature, openings 26a in the commutator, and the openings 50 in the fan 48 and deflects the air against the end member 36, fins 46 and the disk 40 and then the blades 52 force the air outwardly causing the frame to direct the air back over the commutator and rotor. The fins 46 absorb most of the heat from the interiorly circulated air and then transfers most of this heat to the plate 40 by radiation. This heat is rapidly carried from the plate by an outer fan 60 attached to the shaft 27 located on the outer side of the end member 36.

The outer fan 60 comprises a plate 61 having spaced openings 62. The plate 61 is secured to a sleeve 63 which is keyed to the shaft as shown. The plate 61 carries two groups of blades, inner blades 64 and outer blades 65. In this instance the inner group of blades 64 is less in number than the outer group of blades 65. The blades of each group are attached to the plate 61 in any suitable manner. The blades of the inner group are so arranged that the free edges are located in a plane parallel with the plane of the disc 40. The edges are positioned close to the outer face of the plate 40. The purpose of having edges of the fins 64 a very short distance from the outer face of the plate or disc 40 is to insure the maximum rate of transfer of heat from the plate 40. The outer edge or periphery of the plate 61 is cupped as at 61a. The turned-in edge 61a is toward the frame 36 so that air stream produced by the blades 64 will be directed in intimate contact with the disc 40 and over the frame. By this particular construction of the plate 61 excessive eddy currents in the air stream produced by the outer group of blades 65 is prevented.

The fan 60 is located within a shroud or casing 66 which is spaced from the stator frame 20 to provide a fan compartment, said shroud is so arranged in relation to the stator frame to provide ventilating passage 67. The blades 65 of the fan 60 are so arranged to draw a large volume of cool air through a central opening 68 provided in the casing 66 and then force same radially outward and through the ventilating passage 67. In this instance the ventilating passage comprises notches 70 formed at the periphery end member 36 to provide radial ribs 72 between two adjacent notches. These ribs increase the radiating surface of the end member 36 and function as radiators to dissipate some of the heat of the circulated air within the chamber 39. The fins 64 on the outer fan are very close to the disc 40 and rapidly carry the heat from the disc 40. This heat picked up by the fins 64 is carried away when it merges with the currents of circulated air produced by the fan 60 which is directed over the exterior of the stator frame by the shroud to cool same.

While the embodiment of the present invention as herein disclosed, constitutes a preferred form, it is to be understood that other forms might be adopted, all coming within the scope of the claims which follow.

What is claimed is as follows:

1. A dynamo-electric machine comprising a tubular frame closed at each end to form a chamber, one end wall of said chamber having spaced openings; a plate of high heat conductivity attached to the exterior of said mentioned one wall to close the openings; fins of high heat conductivity attached to the plate and extending into the openings to increase the heat dissipating surface of the plate, a fan on each side of the plate secured to a shaft journalled in the said mentioned wall, each fan provided with blades with the blades of the interior fan directing heated air within the chamber toward the plate and fins and the exterior fan drawing heat absorbed by the plate from the plate; and fins carried by the exterior fan and in close proximity to the plate to facilitate a more rapid transfer of the heat from the heated air within the chamber.

2. An enclosed dynamo-electric machine comprising a frame; an end member secured at each end of the frame, one of said end members having a plurality of openings, a thin wall of high heat conducting material attached to said one end member to close the openings and forming therewith and with said frame and the other end member a closed chamber; an armature within the chamber and having its shaft bearings in the end members; fins attached to the wall and projecting through the openings of said one end member into the chamber to increase the heat dissipating surface of the plate; a fan attached to the shaft and located within the chamber and operating to cause air to pass through axial passages provided by the armature and to one end of the chamber into intimate contact with the fins to facilitate a quick transfer of heat from the air enclosed within the chamber; and a second fan attached to the shaft and located on the outside of the plate said fan including a double row of blades, one to circulate air against the thin wall, and the other to circulate additional air over the exterior of the frame.

3. A dynamo-electric machine, comprising a frame; a closure at each end of the frame to form a chamber, one of said closures having spaced openings; a metal disc of high-heat conductivity attached to the said one closure to close the openings; fins rigid with the disc for increasing the heat dissipating surface of the disc; a fan on each side of the disc secured to a shaft journalled in the end closures, said inner fan comprising blades for driving heated air within the chamber against the fins and the disc and said outer fan comprising a plate including a group of blades on opposite sides of and rigid with said plate whereby one group of blades is adapted to direct a stream of air and to drive said air radially outward over the outer face of the disc and the other group of blades is capable of directing another stream of air radially outward; and means for directing both streams of air produced by the outer fan over the exterior of the frame.

4. A dynamo-electric machine comprising a tubular frame closed at each end to form a chamber, one end wall of said chamber having spaced openings; a plate of high heat conductivity attached to the exterior of said mentioned one wall to close the openings; fins of high heat conductivity attached to the plate and extending into the openings to increase the heat dissipating surface of the plate, a fan on each side of the plate secured to a shaft journaled in the end members, and each fan having a group of blades attached to a disc with the blades of the interior fan directing heated air within the chamber toward the plate and fins and the blades of the exterior fans being arranged to produce two streams of air, whereby one group of blades have edges in close proximity to the plate so as to facilitate a more rapid transfer of heat from the heated air within the chamber, said blades adapted to direct one stream of air against and also to drive said air radially outward over the outer face of the plate while the other group of blades is adapted to direct the other stream of air radially outward; and means for directing both streams of air over the outside of the frame.

5. A dynamo-electric machine comprising a tubular frame closed at each end to form a chamber, one end wall of said chamber having spaced openings; a plate of high heat conductivity attached to the exterior of said mentioned one wall to close the openings; fins of high heat conductivity attached to the plate and extending into the openings to increase the heat dissipating surface of the plate, a fan on each side of the plate secured to a shaft journaled in the end members, and each fan having a group of blades attached to a disc with the blades of the interior fan directing heated air within the chamber toward the plate and fins and the blades of the exterior fans being arranged to produce two streams of air whereby one group of blades have edges in close proximity to the plate so as to facilitate a more rapid transfer of heat from the heated air within the chamber, said blades adapted to direct one stream of air against and also to drive said air radially outward over the outer face of the plate while the other group of blades is adapted to direct the other stream of air radially outward; means provided by the disc of the outer fan for preventing the formation of eddy currents in the exterior air streams; and means for directing both exterior air streams over the outside of the frame.

6. A dynamo-electric machine the combination of a tubular frame having closure members at its ends to form a closed chamber, one of said closure members being constructed so as to absorb more heat than the other, a fan on each side of the closure having the greater heat absorbing qualities connected for rotation with a shaft journaled in the closures with the inner fan directing heated air within the chamber against the closure having the greater heat absorbing qualities to facilitate a quick transfer of heat from the air within the chamber and the exterior fan producing two air streams, one stream of air being first directed against the closure and then radially outward to absorb the heat from the closure and the other stream of air being directed in a radially outward direction; means provided by the exterior fan for preventing eddy currents between the two streams of air; and means positioned about the exterior fan and the frame for directing both streams of air along the exterior of the frame.

7. A dynamo-electric machine comprising a tubular frame, a closure at each end of the frame and forming therewith a closed chamber, one of said closures including a plate of high heat conductivity; a fan on each side of said plate secured to a shaft journaled in the closures, said inner fan comprising blades for driving heated air within the chamber against the closure carrying the plate and said outer fan comprising a substantially flat disc carrying a group of blades on opposite sides thereof whereby one group of blades is adapted to direct a stream of air against and also to drive said air radially outward over the outer face of the plate and the other group of blades carried by the disc is capable of directing another stream of air radially outward, said disc having a flange formed integral therewith on its peripheral edge and extending toward the plate so as to prevent eddy currents in the exterior air streams; and means for directing both exterior air streams over the exterior of the frame.

EDWARD M. CLAYTOR.

REFERENCES CITED

The following references are of record in the file of this patent:

UNITED STATES PATENTS

| Number | Name | Date |
|---|---|---|
| 1,652,134 | Thomson | Dec. 6, 1927 |
| 1,884,573 | Chapman | Oct. 25, 1932 |
| 1,932,286 | Smith | Oct. 24, 1933 |
| 1,959,608 | Ansingh | May 22, 1934 |
| 2,043,655 | Ehrmann | June 9, 1936 |

FOREIGN PATENTS

| Number | Country | Date |
|---|---|---|
| 632,055 | Germany | July 2, 1936 |